(12) United States Patent
Gomikawa

(10) Patent No.: US 6,977,690 B2
(45) Date of Patent: Dec. 20, 2005

(54) DATA REPRODUCTION APPARATUS AND DATA REPRODUCTION METHOD

(75) Inventor: Takao Gomikawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

(21) Appl. No.: 09/986,160

(22) Filed: Nov. 7, 2001

(65) Prior Publication Data

US 2003/0020834 A1 Jan. 30, 2003

(30) Foreign Application Priority Data

Jul. 25, 2001 (JP) .............................. 2001-224859

(51) Int. Cl.[7] ............................................... H04N 7/08
(52) U.S. Cl. ..................................................... 348/468
(58) Field of Search ................................ 348/589, 461, 348/465, 468, 478, 473–4, 476, 563–4, 569, 348/600; 345/467, 470, 472, 472.1, 472.2, 345/635

(56) References Cited

U.S. PATENT DOCUMENTS

| | | | | |
|---|---|---|---|---|
| 5,294,982 A | * | 3/1994 | Salomon et al. ............. | 348/461 |
| 5,343,249 A | * | 8/1994 | Moon ........................... | 348/564 |
| 5,477,274 A | * | 12/1995 | Akiyoshi et al. ............ | 348/468 |
| 5,543,851 A | * | 8/1996 | Chang ......................... | 348/468 |
| 5,561,471 A | * | 10/1996 | Kim ............................. | 348/565 |
| 5,572,260 A | * | 11/1996 | Onishi et al. ............... | 348/480 |
| 5,576,768 A | * | 11/1996 | Gomikawa ................... | 348/468 |
| 5,715,352 A | * | 2/1998 | Han ............................. | 386/46 |
| 5,786,864 A | * | 7/1998 | Yamamoto ................... | 348/473 |
| 6,256,072 B1 | * | 7/2001 | Bae et al. .................... | 348/568 |
| 6,470,141 B2 | * | 10/2002 | Kawamura et al. ........... | 386/95 |
| 6,507,369 B1 | * | 1/2003 | Kim ............................. | 348/465 |
| 6,707,504 B2 | * | 3/2004 | Chung ......................... | 348/569 |

FOREIGN PATENT DOCUMENTS

| | | |
|---|---|---|
| JP | 7-236100 | 9/1995 |
| JP | 9-46657 | 2/1997 |
| JP | 9-65295 | 3/1997 |
| JP | 10-74080 | 3/1998 |
| JP | 10-234016 | 9/1998 |
| JP | 11-55586 | 2/1999 |

* cited by examiner

Primary Examiner—Paulos M. Natnael
(74) Attorney, Agent, or Firm—Pillsbury Winthrop Shaw Pittman, LLP

(57) ABSTRACT

A data reproduction apparatus is adapted to receive a first piece of caption information including a first piece of control information for displaying a caption on the screen of a television receiving set and a second piece of caption information including a second piece of control information for displaying the caption in a language different from that of the first piece of caption information, the apparatus comprising a controller for displaying the first and second pieces of caption information simultaneously without overlap by modifying the value of at least either of the first and second pieces of control information.

4 Claims, 13 Drawing Sheets

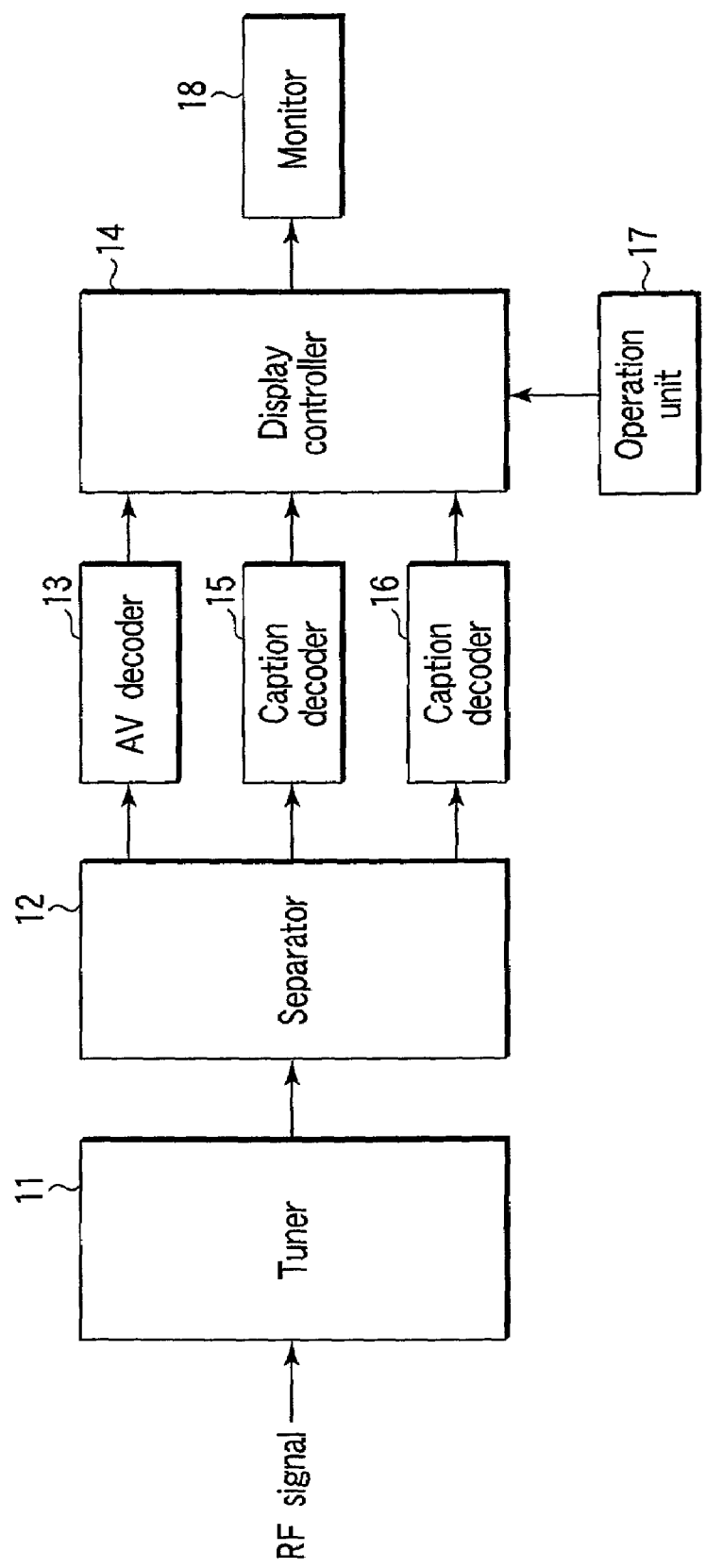
F I G. 1

| No. | Item | No compression | 1/2 compression |
|---|---|---|---|
| 1 | Display area Xa, Ya | | |
| 2 | Display start position Xb, Yb | Display start position Xb, Yb | Display start position Xb/2, Yb/2 |
| 3 | Specification of character forming dots Xc, Yc | Xc, Yc | Xc/2, Yc/2 |
| 4 | Character spacing Xd | Xd | Xd/2 |
| 5 | Line spacing Yd | Yd | Yd/2 |
| 6 | Display block Xe, Ye | Xe=Xc+Xd<br>Ye=Yc+Yd | Xe=Xc/2+Xd/2<br>Ye=Yc/2+Yd/2 |

FIG. 2

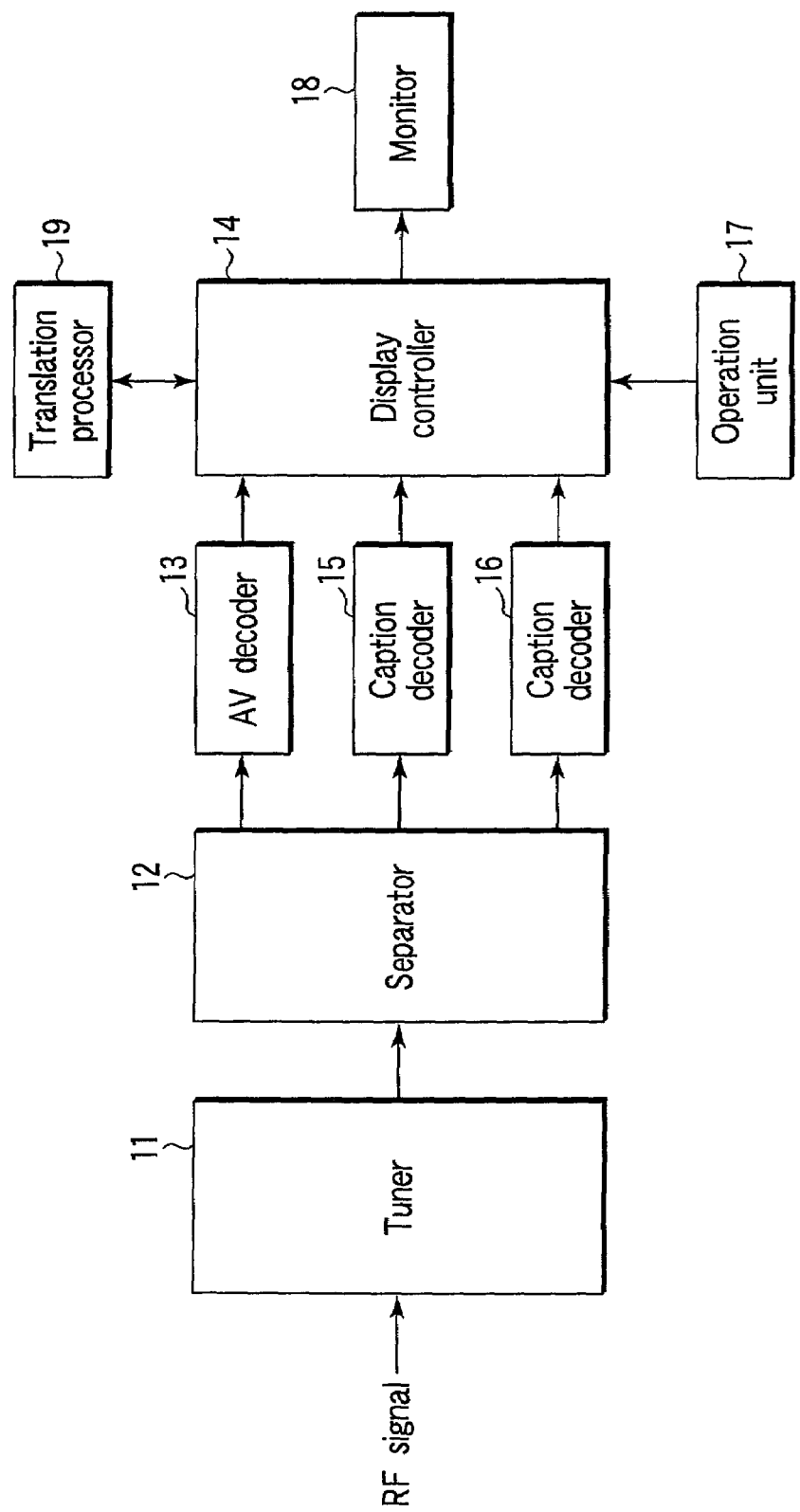
F I G. 12

DATA REPRODUCTION APPARATUS AND DATA REPRODUCTION METHOD

CROSS-REFERENCE TO RELATED APPLICATIONS

This application is based upon and claims the benefit of priority from the prior Japanese Patent Application No. 2001-224859, filed Jul. 25, 2001, the entire contents of which are incorporated herein by reference.

BACKGROUND OF THE INVENTION

1. Field of the Invention

This invention relates to a digital broadcast receiving system for receiving digital television broadcasts typically by way of a satellite. More particularly, the present invention relates to a data reproduction apparatus and a data reproduction method for reproducing a caption to be superimposed that is transmitted by a character broadcasting system.

2. Description of the Related Art

As is well known, digital television broadcasting has started recently and it is now possible for viewers not only to view and listen to televised broadcasts but also acquire various transmitted data by means of a digital television receiving set adapted to receive such data.

With a digital television broadcasting system, the caption transmitted by character broadcasting that is to be superimposed on a television program is displayed at a predetermined position on the screen of the television receiving set showing the television program. As far as this patent document is concerned, the expression of "character broadcasting" refers to both data broadcasting and broadcasting of characters/captions to be superimposed.

Currently, a caption to be superimposed in a plurality of languages is transmitted by data broadcasting and the viewer can select one of the languages and display the caption of that language as superimposed on the corresponding television program.

Meanwhile, it is expected that television broadcasting stations will offer a large variety of television programs than ever in the coming years. Then, a caption may need to be superimposed in a plurality of languages simultaneously.

However, when a caption is superimposed in more than one languages simultaneously, it may be displayed in an overlapping manner. Then, it will be difficult for the viewers watching the program and reading the caption to correctly recognize and understand it.

Known techniques relating to captions to be superimposed include those disclosed in Jpn. Pat. Appln. KOKAI Publication No. 9-65295 and Jpn. Pat. Appln. KOKAI Publication No. 10-234016. However, these documents do not describe anything about dissolving the above identified problem that arises when displaying a caption in a plurality of languages simultaneously.

BRIEF SUMMARY OF THE INVENTION

In view of the above described circumstances, it is therefore the object of the present invention to provide a data reproduction apparatus and a data reproduction method that make it possible to change the size and the position of the area for displaying character information so that a caption may be superimposed in a plurality of different languages simultaneously.

According to the present invention, in an aspect thereof, the above object is achieved by providing a data reproduction apparatus comprising:

an input section receiving a first piece of caption information including a first piece of control information for displaying a caption on the screen of a television receiving set and a second piece of caption information including a second piece of control information for displaying the caption in a language different from that of the first piece of caption information; and a controller displaying the first and second pieces of caption information simultaneously without overlap by modifying the value of at least either of the first and second pieces of control information.

In another aspect of the invention, there is provided a data reproduction method comprising:

a reproducing reprocuding a first piece of caption information including a first piece of control information for displaying a caption on the screen of a television receiving set and a second piece of caption information including a second piece of control information for displaying the caption in a language different from that of the first piece of caption information; and a controlling displaying the first and second pieces of caption information simultaneously without overlap by modifying the value of at least either of the first and second pieces of control information.

BRIEF DESCRIPTION OF THE SEVERAL VIEWS OF THE DRAWING

FIG. 1 is a schematic block diagram of an embodiment of the invention, illustrating a digital television receiving set to which the embodiment is applied;

FIG. 2 is a schematic illustration of pieces of control information to be used for displaying a caption by means of the embodiment of FIG. 1;

FIG. 12 is a schematic block diagram of another embodiment of the invention, illustrating a digital television receiving set to which the embodiment is applied.

DETAILED DESCRIPTION OF THE INVENTION

Figure 3:
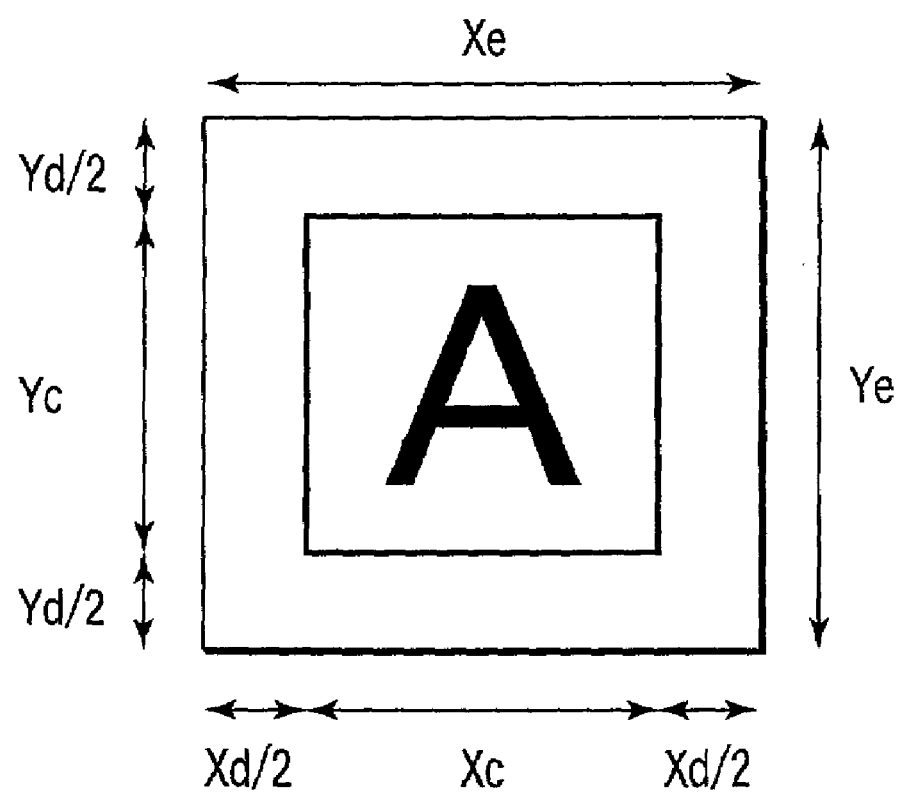
FIG. 3 is a schematic illustration of the block on the screen of a television receiving set for displaying a caption without compression by means of the embodiment of FIG. 1.

Now, the present invention will be described in greater detail by referring to the accompanying drawing that illustrates preferred embodiments of the invention. FIG. 1 is a schematic block diagram of an embodiment of the invention, illustrating a digital television receiving set to which the embodiment is applied. More specifically, RF (radio frequency) signals are supplied to the tuner 11 of the digital television receiving set and one of the supplied signals is selected (tuned in) for display.

The selected RF signal is output from the tuner 11 and fed to separator 12, which separates the television broadcast program component and the caption character information component of the RF signal. Of these, the television broadcast program component is then fed to AV (audio video) decoder 13, which divides the received television broadcast program component further into the video component and the audio component and decodes them. The video component is fed to display controller 14.

On the other hand, the caption character information component fed from the separator 12 is supplied to caption decoders 15, 16 for decoding. The decoded caption character information component is also fed to the display controller 14. The two caption decoders 15, 16 are adapted to concurrently decoded the caption character information component in respective languages.

Then, upon receiving operation-related information from an operation unit 17 that may be a remote control unit, the display controller 14 processes the data fed from the AV decoder 13 and the caption decoders 15, 16 in such a way that the images they represent may be displayed on the screen of monitor 18. If necessary, the display controller 14 compresses and/or synthetically combines the data before the images are displayed on the screen of the monitor 18.

In the case of data broadcasting for transmitting captions to be displayed, the values of six major items as shown in the uncompressed column in FIG. 2 are made to accompany the information on the language to be displayed of the caption and transmitted as control information for the digital television receiving set.

The display controller 14 of the digital television receiving set obtains the character codes indicating the types of the characters to be displayed from the character code data decoded by the caption decoders 15, 16 along with the above described various pieces of control information and causes the monitor 18 to display the caption, using characters of the specified types, on the basis of the outcome of its operation of analyzing the control information.

Now, the control information will be described in greater detail by referring to the "item" column and the "uncompressed" column in FIG. 2. Firstly, the "display area" shown in Item 1 specifies the area for displaying a string of characters on the screen of the monitor 18 in terms of horizontal length Xa and vertical length Ya.

The "display start position" shown in Item 2 specifies the start position, or the upper left corner, of the display area on the screen of the monitor 18 in terms of horizontal position Xb and vertical position Yb. Then, the "specification of character forming dot" shown in Item 3 specifies the size of the characters to be displayed in terms of horizontal length Xc and vertical length Yc.

Then, the "specification of character spacing" shown in Item 4 specifies the space Xd separating adjacent characters and the "specification of line spacing" shown in Item 5 specifies the space Yd separating adjacent lines. Finally, the "display block" shown in Item 6 specifies the display area of each character including the space separating adjacent characters and the space separating adjacent lines as specified in Items 4 and 5 respectively in terms of horizontal length Xe and vertical length Ye as shown in FIG. 3.

Figure 4:
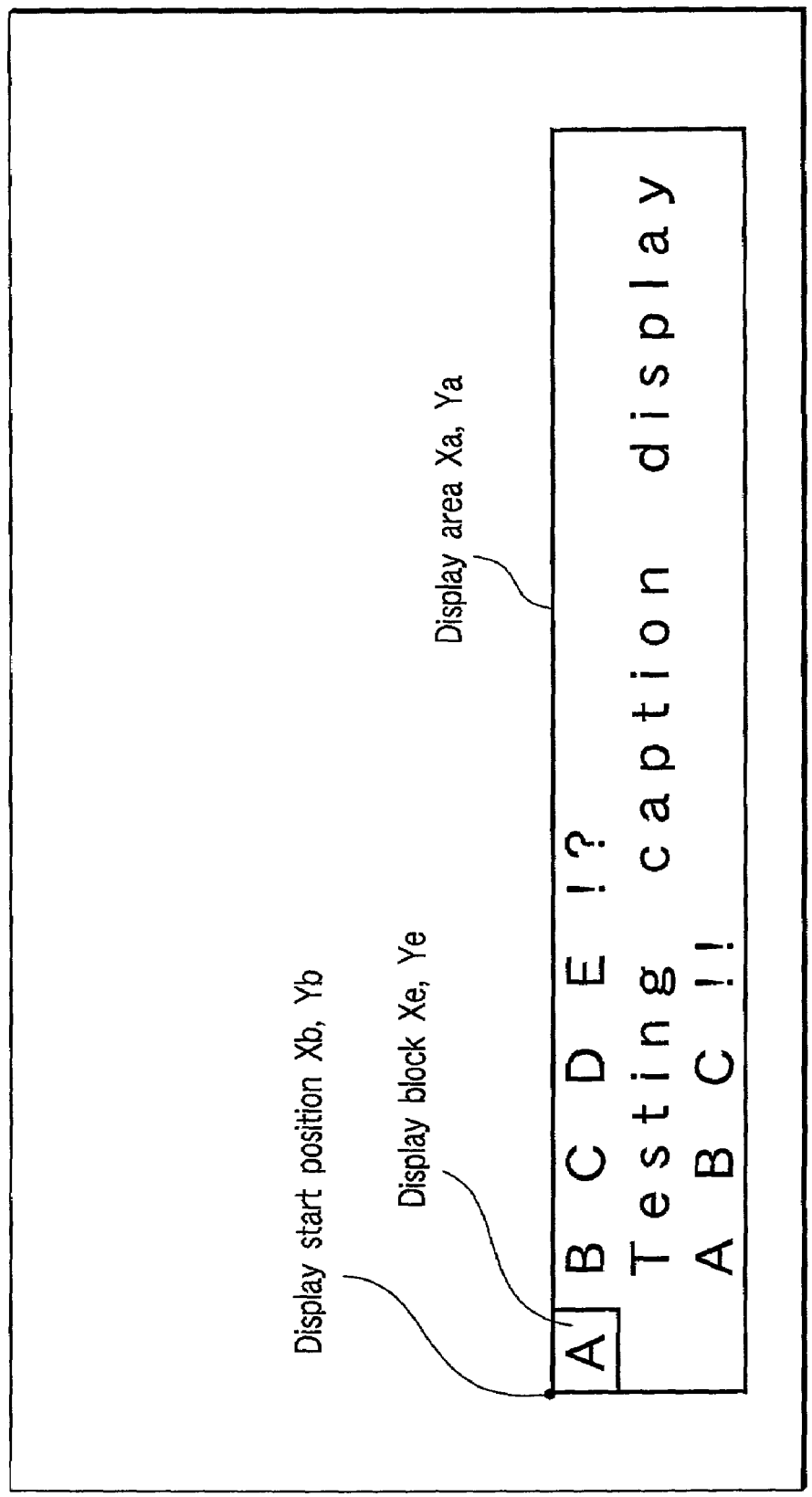
FIG. 4 is a schematic illustration of the normal mode of operation for displaying a caption without compression by means of the embodiment of FIG. 1.

When the normal mode of operation for displaying a caption is required, the display controller 14 operates to display the caption in a manner as shown in FIG. 4 on the screen of the monitor 18 according to the specifications shown in the uncompressed column for the above six items.

Figure 5:
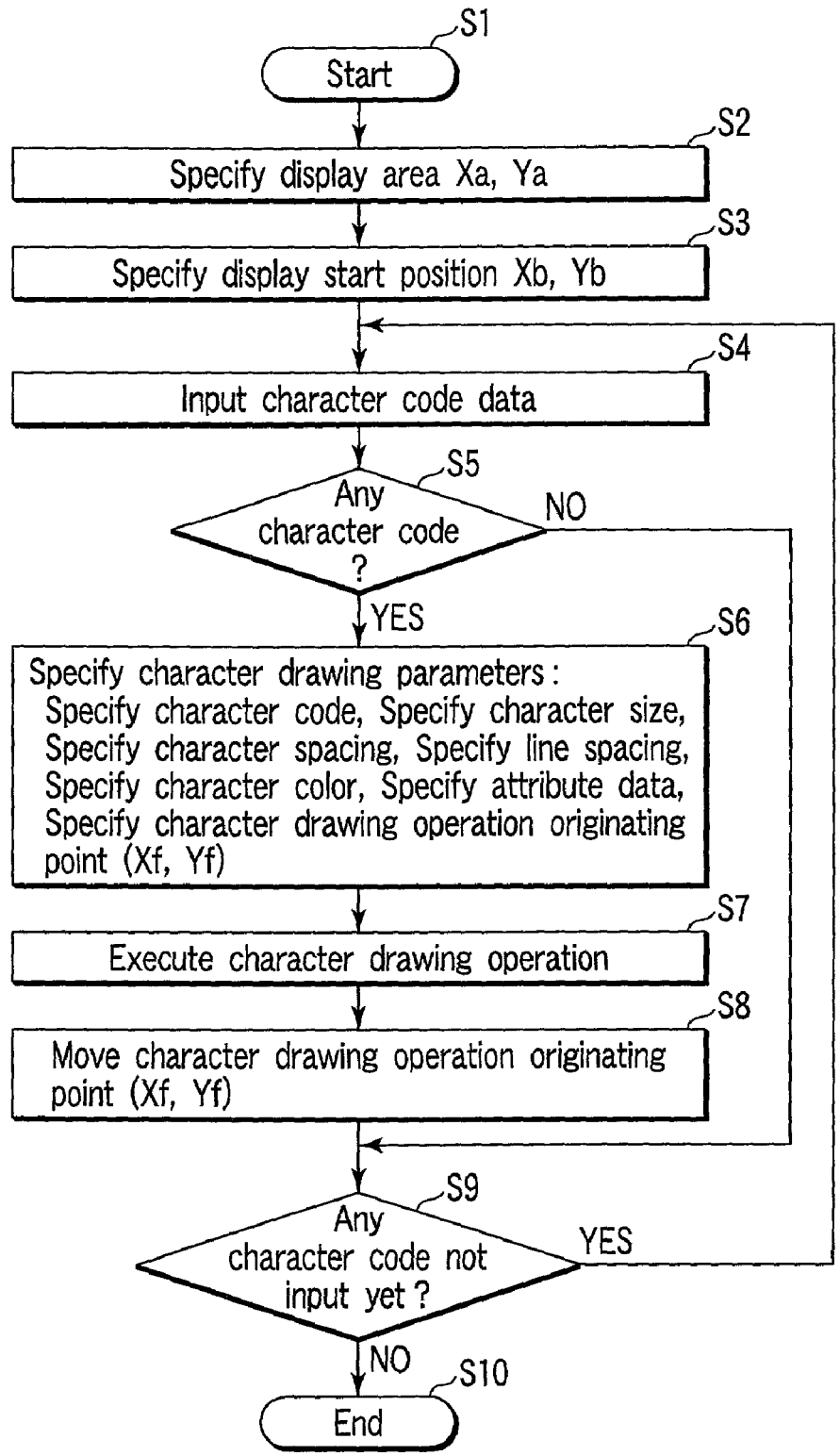
FIG. 5 is a flow chart of the operation of displaying a caption in the normal mode without compression by means of the embodiment of FIG. 1.

FIG. 5 is a flow chart of the operation of displaying a caption in the normal mode without compression by means of the embodiment of FIG. 1. Note that FIG. 5 illustrates only the operation of displaying the caption output from the caption decoder 15 and that of displaying the caption output from the caption decoder 16 is omitted because it is similar to the former operation.

As the operation is started (Step S1), the display controller 14 specifies in Step S2 Xa and Ya for the caption display area on the basis of the transmitted data it has already acquired. Then, the display controller 14 specifies in Step S3 Xb and Yb for the display start position on the basis of the transmitted data it has already acquired.

Thereafter, in Step S4, the display controller 14 receives the character code data obtained from the caption decoder 15. If the received character code data contains data for the caption display area and the display start position, the display controller 14 re-specifies the display area Xa, Ya and the display start position Xb, Yb it specified in Steps S2 and S3 respectively.

Then, in Step S5, the display controller 14 determines if the character code data obtained from the caption decoder 15 contains one or more than one character codes or not. If the character code data contains no character code (NO), it proceeds to Step S9, where it determines if there is a character code data not input from the caption decoder 15 yet or not. It returns to Step S4 if there is a character code data not input yet (YES), whereas it terminates the operation (Step S10) if there is no code data not input from the caption decoder 15 yet.

It, on the other hand, it is determined in Step S5 that the character code data contains one or more than one character codes (YES), the display controller 14 proceeds to Step S6, where it executes a processing operation of selecting various parameters for drawing characters. More specifically, it specifies punctuation codes for the specified character codes and also horizontal and vertical sizes (Xc, Yc) of characters.

Additionally, in Step S6, the display controller 14 specifies character spacing (Xd) for characters and also line spacing (Yd) for lines of characters. Still additionally, it specifies the color of the characters to be displayed, the color of the background of the characters, the color between the foreground and the intermediary and the color between the background and the intermediary. Then, it specifies various attributes of the display including the use or nonuse of boundary lines for the characters to be drawn, the use or non use of underlines, the use or nonuse of parentheses, the use or nonuse of polarity inversions and the use or nonuse of flashing effect. If boundary lines are used, the color to be used for drawing the lines is also specified.

Furthermore, the display controller 14 specifies the position for drawing characters in the coordinate system. More specifically, it determines if the block of the character to be drawn firstly is out of the display area or not. If the former is found within the latter, the values specified for the operation originating point is held unchanged. If, on the other hand, the former is found outside the latter, display controller 14 re-specifies values (Xf, Yf) for the operation originating point after proceeding to the next line.

Then, in Step S7, the display controller 14 executes the operation of drawing characters on the basis of the parameters specified in Step S6 and proceeds to Step S8, where it shifts the position for drawing characters in the coordinate system (Xf, Yf) before proceeding to Step S9. If the position (Xf, Yf) is found outside the display area, then, the display controller 14 specifies values (Xf, Yf) for the operation originating point after moving to the next line before proceeding to Step S9.

Now, the operation of controlling the size and the position of the area for displaying a caption so as to make them variable will be described below. This control operation is realized by the display controller 14 as it carries out certain predetermined arithmetic operations on the specified values of the items of the control information it has acquired from the caption decoders 15, 16 according to a request from the operation unit 17.

For example, the "½ compression" column in FIG. 2 shows the values of the items obtained by halving the specified respective values. More specifically, the "display area" shown in Item 1 specifies the area for displaying a string of characters in terms of horizontal length Xa/2 and vertical length Ya/2.

The "display start position" shown in Item 2 specifies the start position of the display area in terms of horizontal position Xb/2 and vertical position Yb/2.

Then, the "specification of character forming dot" shown in Item 3 specifies the size of the characters to be displayed in terms of horizontal length Xc/2 and vertical length Yc/2. Then, the "specification of character spacing" shown in Item 4 specifies the space Xd/2 separating adjacent characters and the "specification of line spacing" shown in Item 5 specifies the space Yd/2 separating adjacent lines. Finally, the "display block" shown in Item 6 specifies the display area of each character respectively in terms of horizontal length (Xc/2)+(Xd/2) for Xe and vertical length (Yc/2)+(Yd/2) for Ye.

In this way, it is now possible to reduce the area for display the caption on the screen of the monitor 18 to ½ both in the horizontal direction and in the vertical direction and shift the display position.

Figure 6:
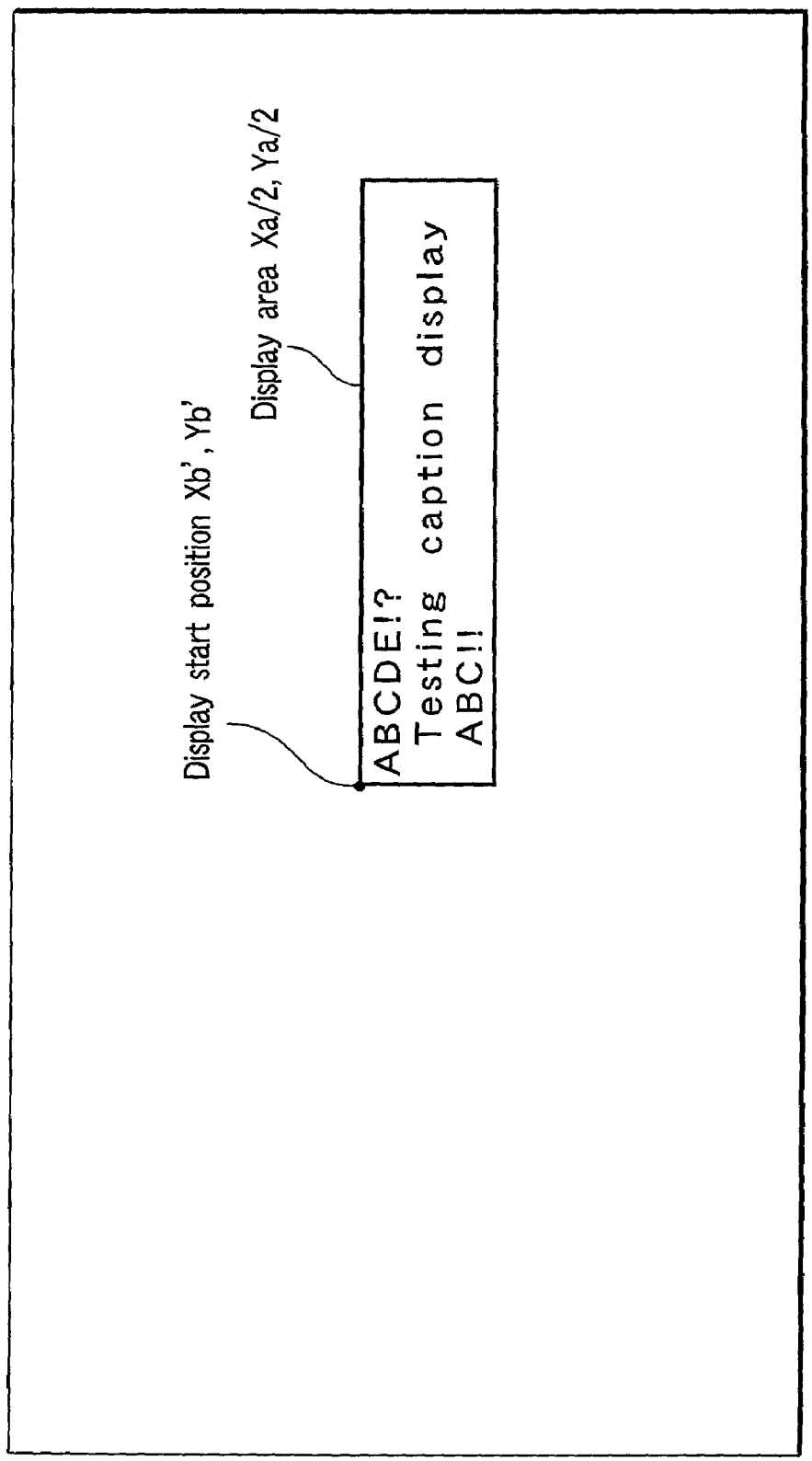
FIG. 6 is a schematic illustration of the compression mode of operation for displaying a caption by means of the embodiment of FIG. 1 when the size and the position of the area for displaying the caption are changed.

FIG. 6 shows an area for displaying the caption defined by reducing its original size to ½ both in the horizontal direction and in the vertical direction and the start position of the display area from the original (Xb, Yb) to (Xb', Yb').

Figure 7:
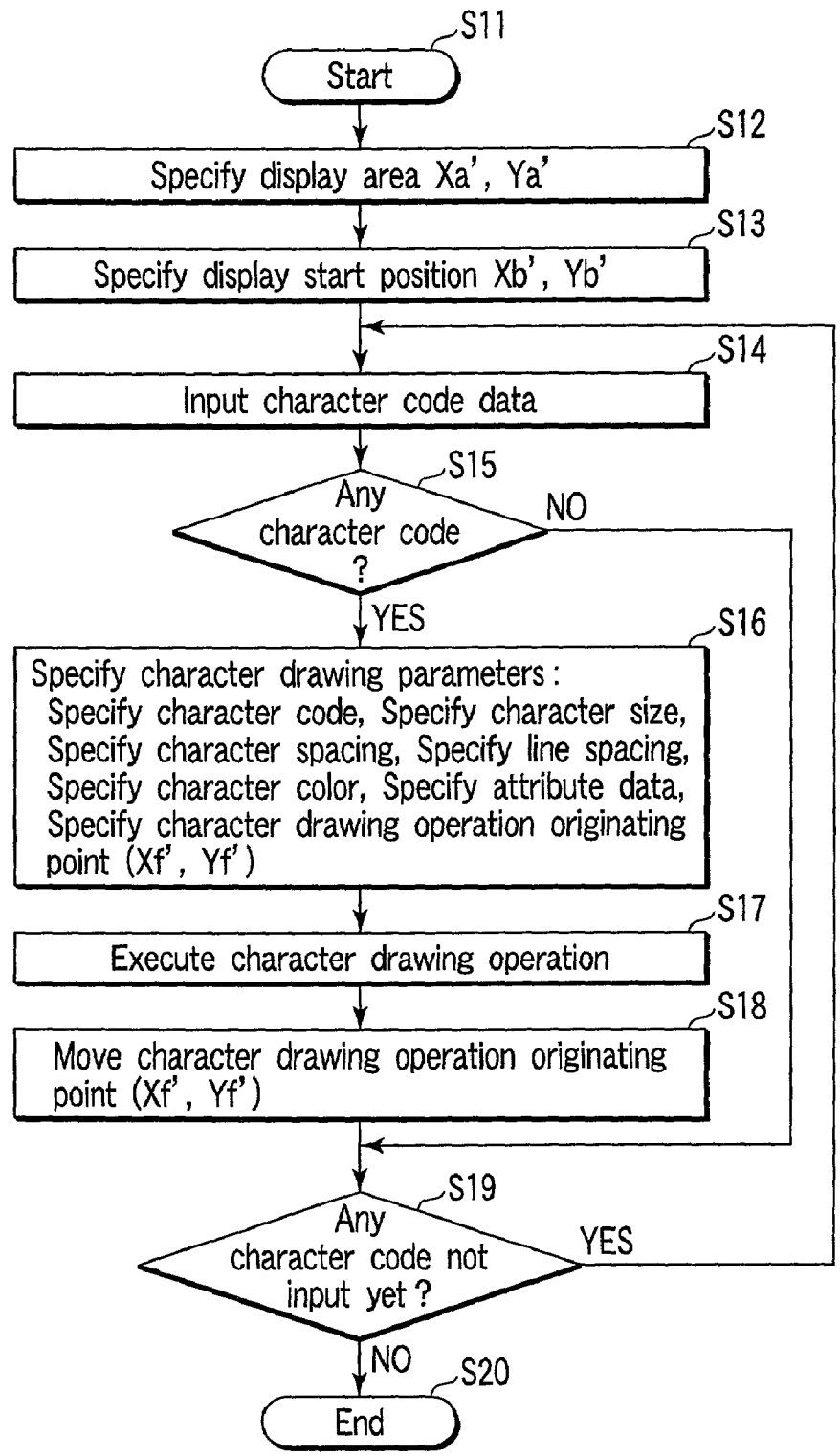
FIG. 7 is a flow chart of the operation of displaying a caption when the size and the position of the area for displaying the caption are changed.

FIG. 7 shows a flow chart of the operation of the display controller 14 for reducing the size of the area for displaying the caption to ½ both in the horizontal direction and in the vertical direction and shifting the display position.

Note that FIG. 7 illustrates only the operation of displaying the caption output from the caption decoder 15 and that of displaying the caption output from the caption decoder 16 is omitted because it is similar to the former operation.

As the operation is started (Step S11), the display controller 14 modifies in Step S12 (Xa, Ya) for the caption display area specified on the basis of the transmitted data it has already acquired to (Xa'=Xa/2, Ya'=Ya/2). Then, the display controller 14 modifies in Step S13 (Xb, Yb) for the display start position specified on the basis of the transmitted data it has already acquired to (Xb', Yb').

Thereafter, in Step S14, the display controller 14 receives the character code data obtained from the caption decoder 15. If the received character code data contains data for the caption display area and the display start position, the display controller 14 re-modifies the display area and the display start position it modified in Steps S12 and S13 to (Xa', Ya') and (Xb', Yb') respectively.

Then, in Step S15, the display controller 14 determines if the character code data obtained from the caption decoder 15 contains one or more than one character codes or not. If the character code data contains no character code (NO), it proceeds to Step S19, where it determines if there is a character code data not input from the caption decoder 15 yet or not. It returns to Step S14 if there is a character code data not input yet (YES), whereas it terminates the operation (Step S20) if there is no code data not input from the caption decoder 15 yet.

It, on the other hand, it is determined in Step S15 that the character code data contains one or more than one character codes (YES), the display controller 14 proceeds to Step S16, where it executes a processing operation of selecting various parameters for drawing characters. More specifically, it specifies punctuation codes for the specified character codes and modifies the horizontal and vertical sizes (Xc, Yc) of characters to (Xc'=Xc/2, Yc'=Yc/2).

Additionally, in Step S16, the display controller 14 modifies the character spacing (Xd) to (Xd'=Xd/2) for characters and also the line spacing (Yd) for lines of characters to (Yd'=Yd/2). Still additionally, it specifies the color of the characters to be displayed, the color of the background of the characters, the color between the foreground and the intermediary and the color between the background and the intermediary. Then, it specifies various attributes of the display including the use or nonuse of boundary lines for the characters to be drawn, the use or non use of underlines, the use or nonuse of parentheses, the use or nonuse of polarity inversions and the use or nonuse of flashing effect. If boundary lines are used, the color to be used for drawing the lines is also specified.

Furthermore, the display controller 14 specifies the position for drawing characters in the coordinate system. More specifically, it determines if the block of the character to be drawn firstly is out of the display area relative to the values (Xf, Yf) defined for the operation originating point or not. If the former is found within the latter, the values specified for the operation originating point is held unchanged. If, on the other hand, the former is found outside the latter, display controller 14 re-specifies the modified values (Xf', Yf') for the operation originating point after proceeding to the next line.

Then, in Step S17, the display controller 14 executes the operation of drawing characters on the basis of the parameters specified in Step S16 and proceeds to Step S18, where it shifts the position for drawing characters in the coordinate system (Xf, Yf) before proceeding to Step S19. If the position (Xf, Yf) is found outside the display area, then, the display controller 14 modifies the values (Xf, Yf) specified for the operation originating point after moving to the next line to (Xf'Yf') before proceeding to Step S19.

Figure 8:
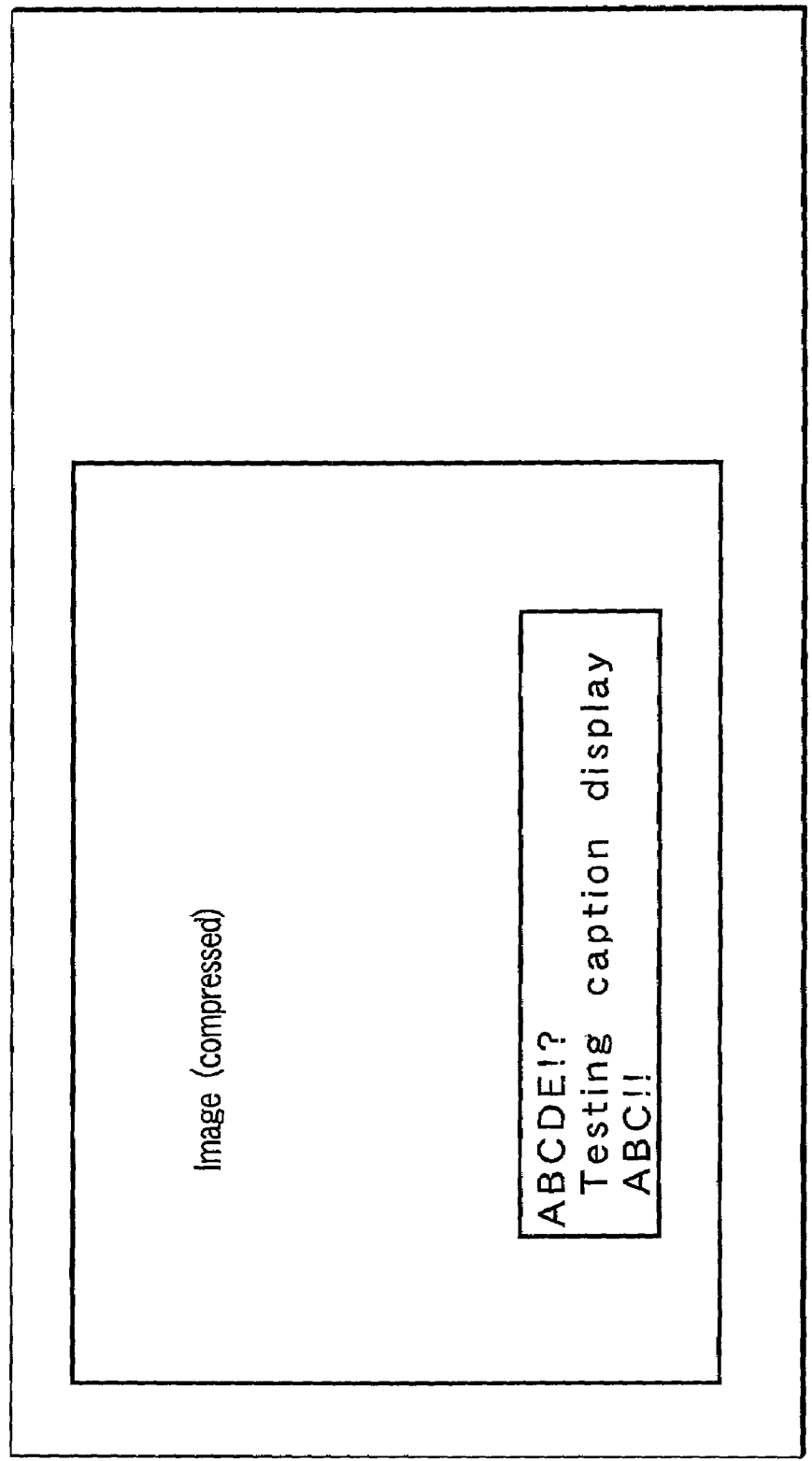
FIG. 8 is schematic illustration of the screen of a television receiving set when the size and the position of the area for displaying a caption are automatically defined.

With the above operation, it is now possible to modify the size and the position of the area for displaying the caption. Then, it may be so arranged that, if the television program turned in by the viewer is compressed and displayed, the embodiment automatically computes the start position (Xb', Yb') for drawing characters for the caption by referring to the lower left corner of the screen. Then, the caption is displayed at an optimal position on the screen as shown in FIG. 8.

Figure 9:
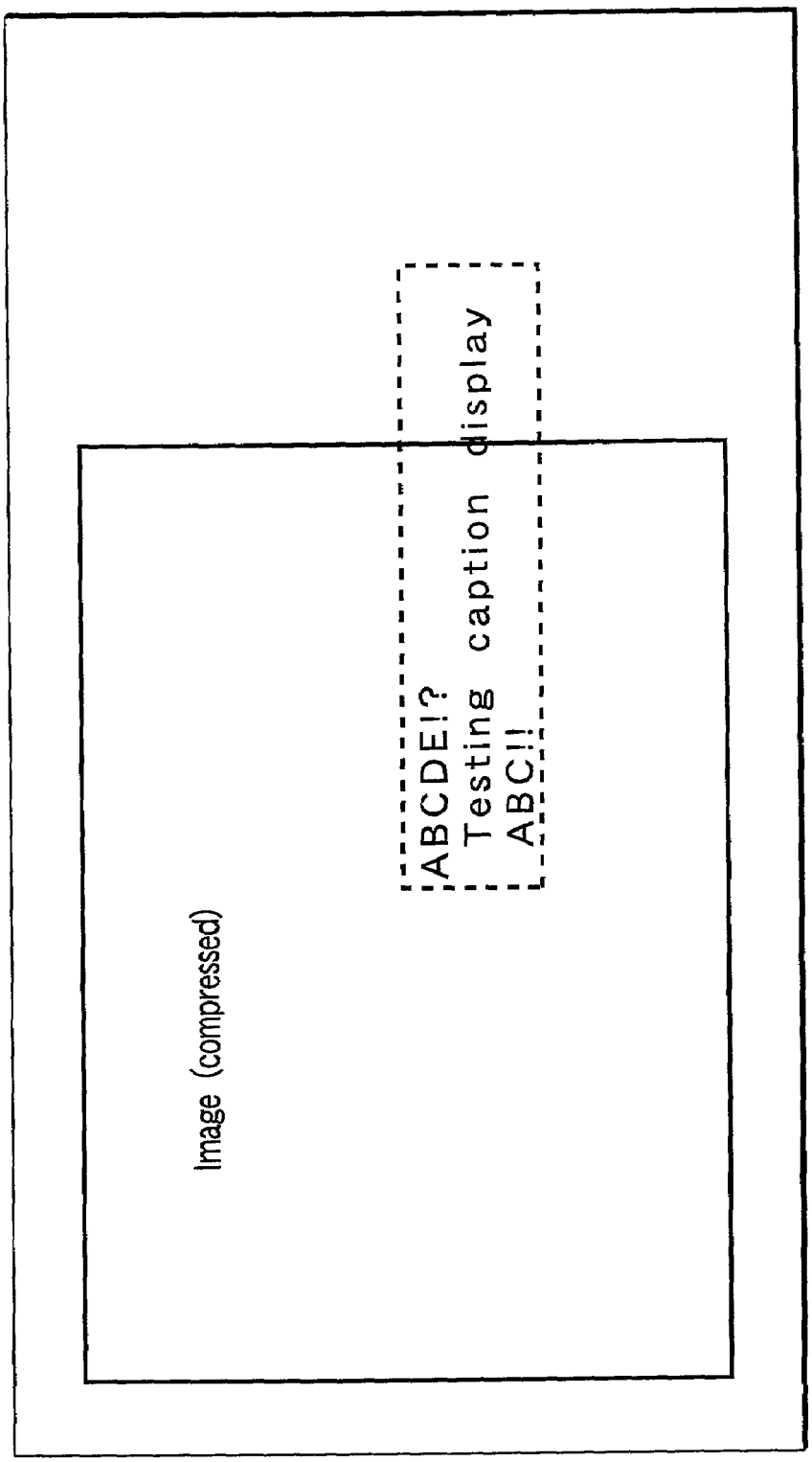
FIG. 9 is schematic illustration of the screen of a television receiving set when the size and the position of the area for displaying a caption are manually automatically defined.

Alternatively, it may be so arranged that the start position (Xb', Yb') is manually defined by means of the operation unit 17 so that the caption display area may be moved to any place on the screen. When, the caption display area is manually defined, it is shown by dotted lines as shown in FIG. 9 to indicate that the operation of manually defining the caption display area is going on.

If the caption display area is moved automatically or manually and made to partly go out of the screen, the display controller 14 forces the caption display area to stay on the screen.

Figure 10:
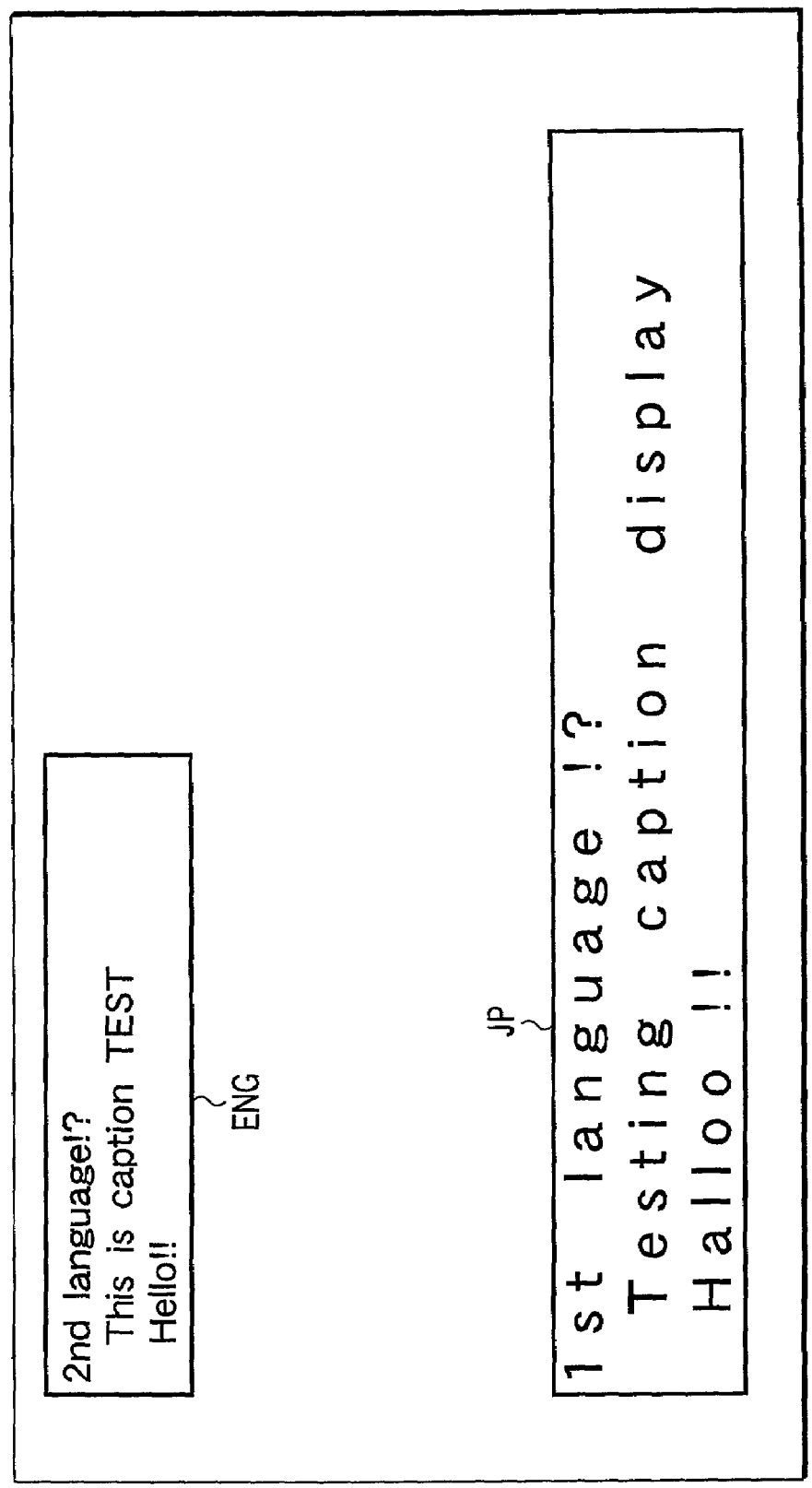
FIG. 10 is a schematic illustration of a mode of operation for displaying a caption both in Japanese and in English simultaneously by means of the embodiment of FIG. 1.

FIG. 10 shows a caption displayed both in Japanese JP and in English ENG simultaneously on the screen of the monitor 18. In this case, the caption character information component for Japanese is decoded by the caption decoder 15 and supplied to the display controller 14, while the caption character information component for English is decoded by the caption decoder 16 and supplied to the display controller 14.

Then, the caption in Japanese JP is not compressed and displayed at the proper position on the screen by the display controller 14 on the basis of the control information for displaying the caption transmitted by data broadcasting, whereas the caption in English ENG is compressed horizontally and vertically to ½ and moved to an upper left position on the screen. Then, the caption in Japanese JP and the caption in English ENG are displayed simultaneously without overlapping each other.

The frame enclosing the display area for the caption in Japanese JP and the frame enclosing the caption in English ENG may be shown in different colors and/or the characters of the caption in Japanese JP and those of the caption in English ENG may be shown in different colors.

Figure 11:
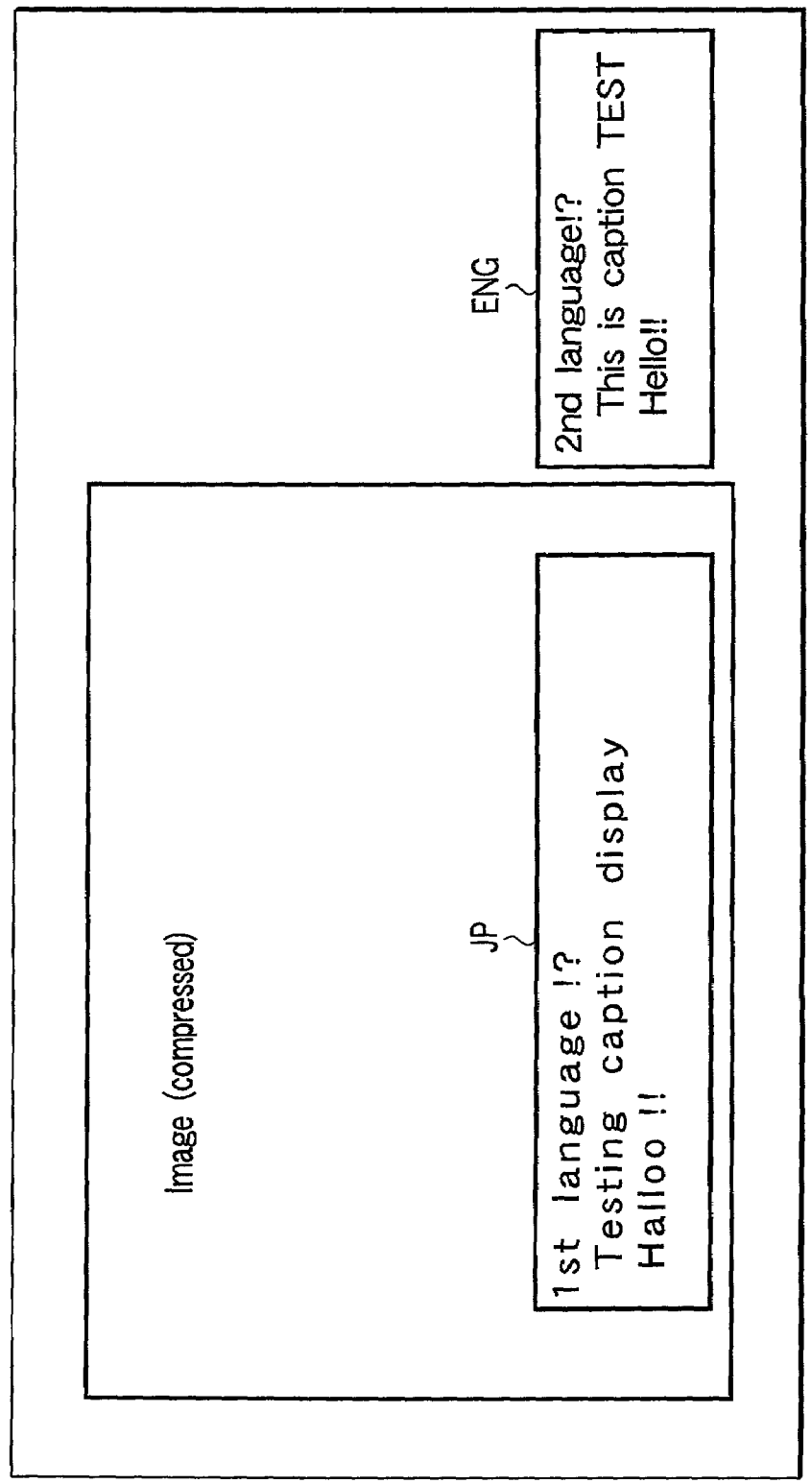
FIG. 11 is a schematic illustration of another mode of operation for displaying a caption both in Japanese and in English simultaneously by means of the embodiment of FIG. 1.

FIG. 11 is a schematic illustration of another mode of operation for displaying a caption both in Japanese JP and in English ENG simultaneously on the screen of the monitor 18 by means of the embodiment of FIG. 1. In this case, the television program tuned in by the viewer is compressed and displayed and the caption in Japanese JP is also compressed and displayed within the image of the television program, whereas the caption in English ENG is also compressed and displayed outside the image of the television program.

FIG. 12 is a schematic block diagram of another embodiment of the invention, illustrating a digital television receiving set to which the embodiment is applied. In FIG. 12, the components similar to or same as those of FIG. 1 are denoted respectively by the same reference symbols. A translation processor 19 is connected to the display controller 14. The translation processor 19 has a functional feature of converting the character codes of a caption in Japanese into those in English.

Figure 13:
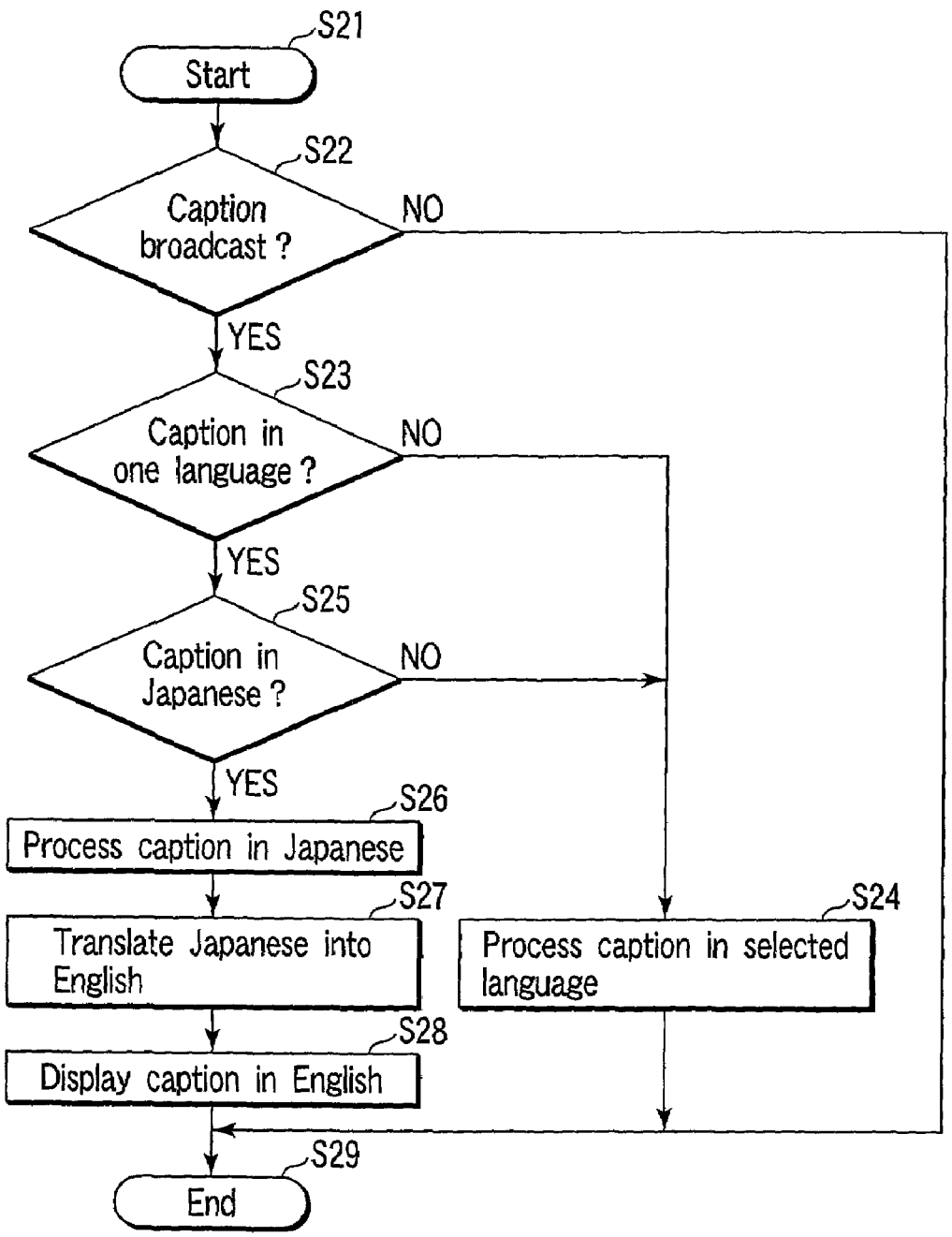
FIG. 13 is a flow chart of the operation of displaying a caption in a plurality of languages simultaneously by means of the embodiment of FIG. 12.

FIG. 13 is a flow chart of the operation of the display controller 14 for displaying a caption in a plurality of languages simultaneously by means of the embodiment of FIG. 12 comprising the translation processor 19. Referring to FIG. 13, as the operation is started (Step S21), the display controller 14 determines in Step S22 if the tuned in program is accompanied by a caption or not. If the program is not accompanied by a caption (NO), the operation is terminated (Step S29).

If it is determined that the turned in program is accompanied by a caption (YES), the display controller 14 proceeds to Step S23, where the number of language used for the caption is equal to one or not. If the number is not equal to one (NO), the display controller 14 proceeds to Step S24, where it carries out a processing operation for displaying the caption in the selected more than one languages before terminating the operation (Step S29).

If, on the other hand, the number if equal to one (YES), the display controller 14 proceeds to Step S25, where it determines if the language of the caption is Japanese or not. If the language is not Japanese (NO), the display controller 14 moves to Step S24. If, on the other hand, the language is Japanese (YES), the display controller 14 proceeds to Step S26, where it carries out a processing operation for displaying the caption in Japanese.

Thereafter, the display controller 14 controls the translation processor 19 to cause it to convert the character codes of a caption in Japanese into those in English in Step S27 and proceeds to Step S28, where it displays the character codes in English as caption in English simultaneously with the caption in Japanese at a position that does not overlap the position of the latter before terminating the operation (Step S29).

With this arrangement, if the caption is broadcast only in Japanese by character broadcasting, the caption in Japanese can be translated into English and the caption in English can be displayed simultaneously with the caption in Japanese.

While the embodiment of FIGS. 12 and 13 is described in terms of translating the caption in Japanese into English and displaying the caption in English, it may be appreciated that the caption may be translated into one or more than one desired languages when corresponding translation means are provided.

While the present invention is described above by way of two preferred embodiments adapted to display a caption transmitted by way of digital television broadcasting, the present invention is by no means limited thereto and can be used to display a caption in a plurality of languages simultaneously on a program stored in a DVD (digital versatile disc) with the caption.

What is claimed is:
1. A data reproduction apparatus comprising:
an input section configured to receive a RF signal which includes broadcast program information, first caption character information including first character information relating to the broadcast program information, and second caption character information including second character information differing in language from that of the first character information;
a separating section configured to separate the broadcast program information, the first caption character information, and the second caption character information from the RF signal input at the input section;
an AV decoder configured to decode visual information and audio information from the broadcast program information separated at the separating section;
a first caption decoder configured to decode the first caption information and first control information representing a displaying portion for displaying the first caption information, a display starting position, a character size, a character spacing, a line spacing, and a block for displaying one character, from the first caption character information separated at the separating section;
a second caption decoder configured to decode the second caption information and second control information representing a displaying portion for displaying the second caption information, a display starting position, a character size, a character spacing, a line spacing, and a block for displaying one character, from the second caption character information separated at the separating section; and a displaying control section configured to display the first caption information and the second caption information, which are superimposed on the image information, concurrently without overlap, by processing at least one of the first control information and the second control information.

2. The data reproduction apparatus according to claim 1, wherein the display control section displays the first caption information and the second caption information concurrently without overlap in respective colors that are different from each other.

3. A method for data reproduction comprising:

receiving an RF signal which includes broadcast program information, first caption character information including first character information relating to the broadcast program information, and second caption character information including second character information differing in language from that of the first character information;

separating the broadcast program information, the first caption character information, and the second caption character information from the RF signal;

decoding visual information and audio information from the broadcast program information separated at the separating section;

decoding the first caption information and first control information representing a displaying portion for displaying the first caption information, a display starting position, a character size, a character spacing, a line spacing, and a block for displaying one character, from the first caption character information separated at the separating section;

decoding the second caption information and a second control information representing a displaying portion for displaying the second caption information, a display starting position, a character size, a character spacing, a line spacing, and a block for displaying one character, from the second caption character information separated at the separating section;

displaying both the first caption information and the second caption information, which are superimposed on the image information, concurrently without overlap, by processing at least one of the first control information and the second control information.

4. A method for data reproduction according to claim 3, wherein the first caption information and the second caption information can be displayed concurrently in respective colors that are different from each other.

* * * * *